(12) United States Patent
Stewart et al.

(10) Patent No.: US 7,182,803 B2
(45) Date of Patent: Feb. 27, 2007

(54) SOLIDS MULTI-CLONE SEPARATOR

(75) Inventors: Albert E Stewart, Sylmar, CA (US); Jeffrey A Mays, Woodland Hills, CA (US); Kenneth M Sprouse, Northridge, CA (US)

(73) Assignee: United Technologies Corporation, Hartford, CT (US)

(*) Notice: Subject to any disclaimer, the term of this patent is extended or adjusted under 35 U.S.C. 154(b) by 307 days.

(21) Appl. No.: 10/869,642

(22) Filed: Jun. 16, 2004

(65) Prior Publication Data

US 2005/0279058 A1    Dec. 22, 2005

(51) Int. Cl.
*B01D 45/12*    (2006.01)

(52) U.S. Cl. .................. 95/269; 55/341.1; 55/347; 55/435; 55/457

(58) Field of Classification Search ............. 55/341.1, 55/346, 348, 347, 435, 457; 95/269
See application file for complete search history.

(56) References Cited

U.S. PATENT DOCUMENTS 3,273,320 A  *  9/1966  Delaune et al. ............ 55/434.1
3,420,040 A  *  1/1969  Neely et al. ................. 55/346
4,017,278 A      4/1977  Reese
4,776,860 A     10/1988  Najjar et al.
5,343,830 A      9/1994  Alexander et al.
6,269,778 B1     8/2001  Anderson et al.
6,395,237 B1     5/2002  Wietzke et al.
6,418,973 B1     7/2002  Cox et al.
6,673,133 B2     1/2004  Sechrist et al.

* cited by examiner

*Primary Examiner*—Robert A. Hopkins
(74) *Attorney, Agent, or Firm*—Harness, Dickey & Pierce, P.L.C.

(57) ABSTRACT

A cyclone separator includes a body having a side entry fluid inlet, a first outlet and a second outlet both aligned substantially transverse to the fluid inlet, and has the first and second outlets opposing each other. A cyclone tube assembly is positioned within the body having at least a portion of the cyclone tube assembly positioned in a direct unobstructed alignment path with the fluid inlet. The cyclone tube assembly includes a plurality of cyclone tubes, each including a first tube section and a second tube section partially positioned within the first tube section. A ceramic material forms at least a portion of the second tube section of each cyclone tube. A first tube connection plate supports the first tube section of each of the cyclone tubes. A second tube connection plate supports the second tube section of each of the cyclone tubes. The first tube connection plate is angularly offset from the second tube connection plate.

25 Claims, 5 Drawing Sheets

SOLIDS MULTI-CLONE SEPARATOR

FIELD OF THE INVENTION

The present invention relates in general to hydrogen generation by steam reforming of natural gas and more specifically to a device and method for separating solid materials from a solids/gaseous flow stream used in such a reforming process.

BACKGROUND OF THE INVENTION

The generation of hydrogen from natural gas via steam reforming is a well established commercial process. One drawback is that commercial units tend to be extremely large in volume and subject to significant amounts of methane slip, identified as methane feedstock which passes through the reformer un-reacted.

To reduce the size and increase conversion efficiency of the units, a process has been developed which uses calcium oxide to improve hydrogen yield by removing carbon dioxide generated in the reforming process. See U.S. patent application Ser. No. 10/271,406 entitled "HYDROGEN GENERATION APPARATUS AND METHOD", filed Oct. 15, 2002, commonly assigned to the assignee of the present invention, the disclosure of which is incorporated herein by reference. The calcium oxide reacts with the $CO_2$ in a separation reaction, producing a solid calcium carbonate ($CaCO_3$) and absorbing the $CO_2$.

The calcium carbonate reuse process requires that the calcium, in either $CaCO_3$ or $CaO$ (solid) be separated from the system gases, including the hydrogen gas product as well as carbon dioxide, un-reacted methane, excess oxygen and/or nitrogen, so the calcium carbonate particles can be either reformed to calcium oxide or transferred for reuse as calcium oxide. Cyclone separators are commercially known which can separate small particles from a fluid flow stream. At the 649° C. (1200° F.) to 983° C. (1800° F.) temperatures of the calcium carbonate reuse process, however, known commercial cyclone separators may not provide adequate resistance to thermal shock or a pressure drop meeting system requirements.

SUMMARY OF THE INVENTION

According to a preferred embodiment of the present invention, a cyclone separator includes a body having a side entry fluid inlet, a first outlet and a second outlet both aligned substantially transverse to the fluid inlet, and the first and second outlets opposing each other. A cyclone tube assembly is positionable within the body and having at least a portion of the cyclone tube assembly positioned in a direct unobstructed alignment path with the fluid inlet, the cyclone tube assembly including: a plurality of cyclone tubes, each including a first tube section and a second tube section partially positionable within the first tube section; a ceramic material operably forming at least a portion of the second tube section of each cyclone tube; a first tube connection plate connectably supporting the first tube section of each of the cyclone tubes; and a second tube connection plate connectably supporting the second tube section of each of the cyclone tubes. The first tube connection plate is angularly offset from the second tube connection plate.

According to another preferred embodiment of the present invention, a cyclone separator system includes a cyclone separator body having a body wall and opposed first and second ends. A first insulation layer is positioned within the separator body in contact with the outer wall. A cyclone tube assembly has a plurality of cyclone tubes, the cyclone tube assembly positioned in contact with the insulation layer. A substantially gas-tight seal is operably formed between the cyclone tube assembly and the insulation layer. A mixture inlet is connected to the body wall substantially transverse to the opposed first and second ends, the mixture inlet having an interior insulation layer. A plurality of arc-shaped flow directing members are disposed on each of the cyclone tubes. A mixture contacting the flow directing members is operably directed in a cyclonic flow path within each of the cyclone tubes.

According to still another preferred embodiment of the present invention, a method for separating a plurality of particles from a fluid using a cyclone separator, the cyclone separator including a separator body, a fluid inlet, a gas outlet, a particle outlet, and a cyclone separator tube assembly having a plurality of cyclone tubes, includes: continuously reducing a height of the cyclone tube assembly from an inlet to a distal end of the cyclone tube assembly; aligning at least a portion of the inlet of the cyclone separator tube assembly with the fluid inlet; directing a heated fluid containing at least a plurality of particles via the fluid inlet into the cyclone separator tube assembly; accelerating the heated fluid at a tube inlet of each of the cyclone tubes; separating the heated fluid within the cyclone tubes into the plurality of particles and a gas; and discharging the plurality of particles from the particle outlet.

The features, functions, and advantages can be achieved independently in various embodiments of the present invention or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
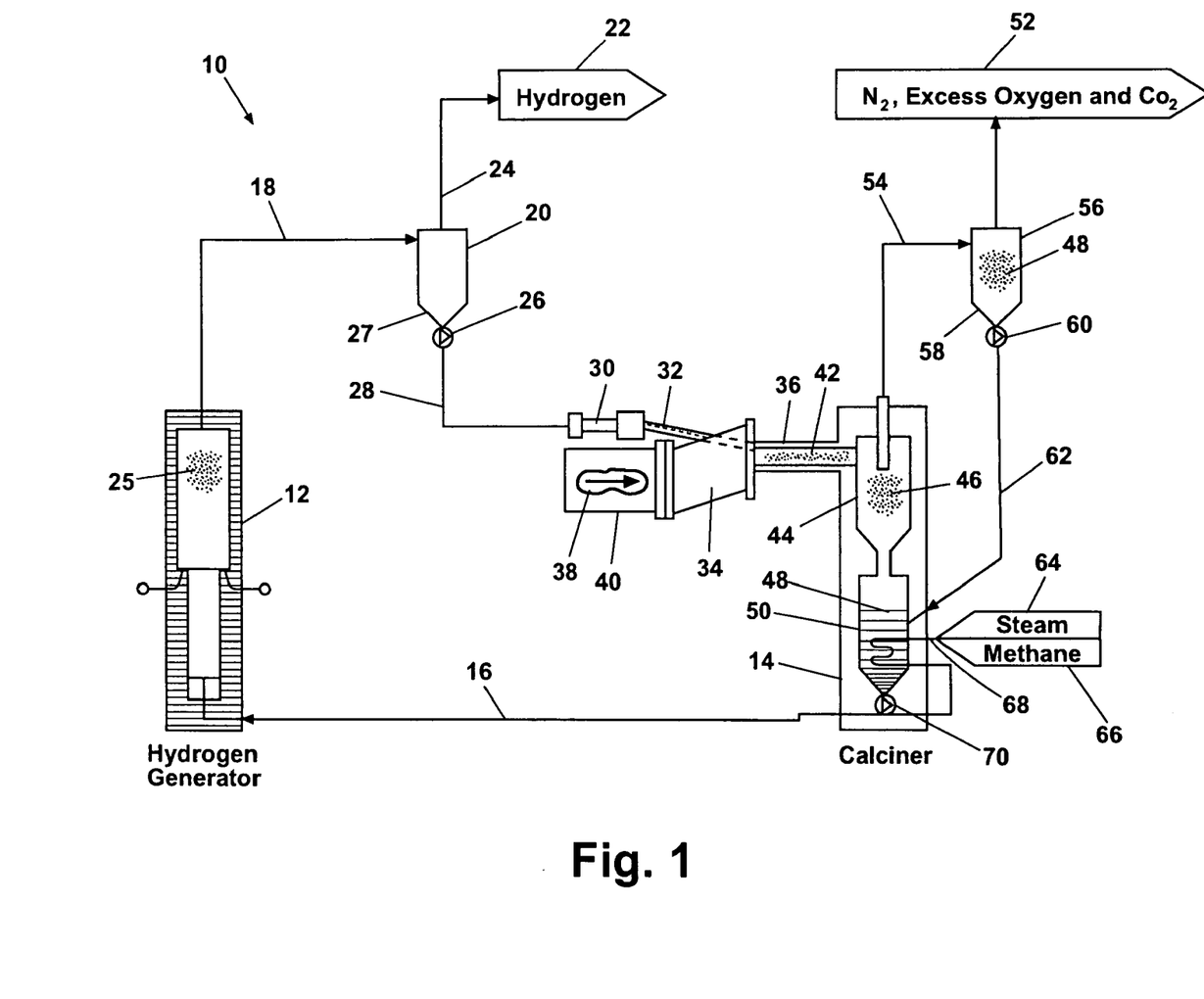
FIG. 1 is a diagrammatic view showing a calcium oxide reuse system having a plurality of solids cyclone separators according to a preferred embodiment of the present invention.

Referring generally to FIG. 1, according to a preferred embodiment of the present invention, a reformation system 10 includes a hydrogen generator 12 which receives reaction products from a calciner 14 via a generator feed line 16. Discharge from the hydrogen generator 12 is provided via a generator discharge line 18 to a hydrogen cyclone separator 20 of the present invention. Hydrogen gas 22 is largely removed from hydrogen cyclone separator 20 via a hydrogen discharge line 24. A plurality of calcium carbonate ($CaCO_3$) particles 25, which are entrained in a flow that can contain hydrogen, steam and nitrogen gases from hydrogen generator 12, are separated and collected for discharge at a discharge end 27 of hydrogen cyclone separator 20. The calcium carbonate particles 25 are transferred via a hot rotary screw pump (hereinafter screw pump) 26 via a return line 28 back to calciner 14. An exemplary screw pump is disclosed in United States patent application entitled "HOT ROTARY SCREW VALVE/PUMP", concurrently filed herewith, commonly assigned to the assignee of the present invention, the disclosure of which is incorporated herein by reference.

In return line 28 a flow splitter 30 can be disposed having at least one feed tube 32 discharging the calcium carbonate particles 25 into a calciner injector 34. An exemplary calciner injector 34 is disclosed in United States patent application entitled "DRY, LOW NITROUS OXIDE CALCINER INJECTOR, concurrently filed herewith, commonly assigned to the assignee of the present invention, the disclosure of which is incorporated herein by reference. Calciner injector 34 can be connected to a calciner inlet 36 of calciner 14. A hot, vitiated air volume 38 can be introduced via a vitiated air generator 40 into calciner injector 34. Details of vitiated air generator 40 are provided in U.S. patent application entitled "Non-Swirl Dry Low NOx (DLN) Combustor" filed Feb. 26, 2004, commonly assigned to the assignee of the present invention, the disclosure of which is incorporated herein by reference.

Calciner inlet 36 can receive a mixture 42 including the calcium carbonate particles 25 and the hot vitiated air volume 38 discharged into calciner inlet 36 upstream of a cyclone separator 44 of the present invention within calciner 14. Regeneration of the calcium carbonate particles 25 back to calcium oxide occurs primarily within calciner inlet 36. As a result of the regeneration process, as well as the addition of steam and methane as noted below, a calcium oxide/nitrogen/carbon dioxide mixture 46 is created within cyclone separator 44. A plurality of relatively heavier calcium oxide particles 48 are separated within cyclone separator 44 and fall into a hopper 50 within calciner 14. A gas volume 52 containing primarily nitrogen and carbon dioxide gases, together with a small carryover volume of calcium oxide particles 48, is discharged from cyclone separator 44 via a gas discharge line 54 to a cyclone separator 56 of the present invention. Gas volume 52 can be discharged from cyclone separator 56, leaving the carryover volume of calcium oxide particles 48 to collect in a bottom hopper area 58 of cyclone separator 56. A screw pump 60 can return the carryover volume of calcium oxide particles 48 via a calciner input line 62 to hopper 50 of calciner 14. A steam supply 64 and a methane supply 66 can be connected to calciner 14 and a steam/methane mixture 68 together with the regenerated calcium oxide particles 48 can be transferred via a screw pump 70 to hydrogen generator 12 to repeat the process.

During operation of reformation system 10, hydrogen generator 12 reacts steam from steam supply 64 and methane from methane supply 66 to generate hydrogen and carbon dioxide. The carbon dioxide is removed from hydrogen generator 12 by reaction with the calcium oxide particles 48 entrained with steam/methane mixture 68. The hydrogen 22 is removed via hydrogen cyclone separator 20 as previously discussed. As the calcium oxide particles 48 absorb the carbon dioxide, calcium carbonate particles 25 are formed which are transferred by screw pump 26 in particulate form out of hydrogen cyclone separator 20, as previously discussed, and into calciner injector 34. Hot, vitiated air volume 38 impinges and reacts with the calcium carbonate particles 25 in calciner inlet 36 to reform calcium oxide particles 48 from mixture 42, which subsequently enter cyclone separator 44 of calciner 14. Within cyclone separator 44, the calcium oxide particles 48 and calcium oxide/nitrogen/carbon dioxide mixture 46 are separated, with the calcium oxide particles 48 dropping down into hopper 50. During operation of reformation system 10, calcium carbonate particles 25 are continuously reformed to calcium oxide particles 48 and calcium oxide particles 48 are returned in particulate form with steam/methane mixture 68 using screw pump 70 to hydrogen generator 12.

System conditions at the inlet to each of the cyclone separators 20, 44 and 56 are approximately as follows:
a) Hydrogen cyclone separator 20 inlet: pressure approximately 0.793 MPa (115 psia), temperature approximately 649° C. (1200° F.);
b) Cyclone separator 44 inlet: pressure approximately 0.670 MPa (100 psia), temperature of calcium carbonate particles/steam/methane mixture approximately 982° C. (1800° F.); and
c) Cyclone separator 56 inlet: pressure approximately 0.655 MPa (95 psia), temperature of calcium oxide particles/steam/carbon dioxide/nitrogen mixture approximately 982° C. (1800° F.).

Figure 2:
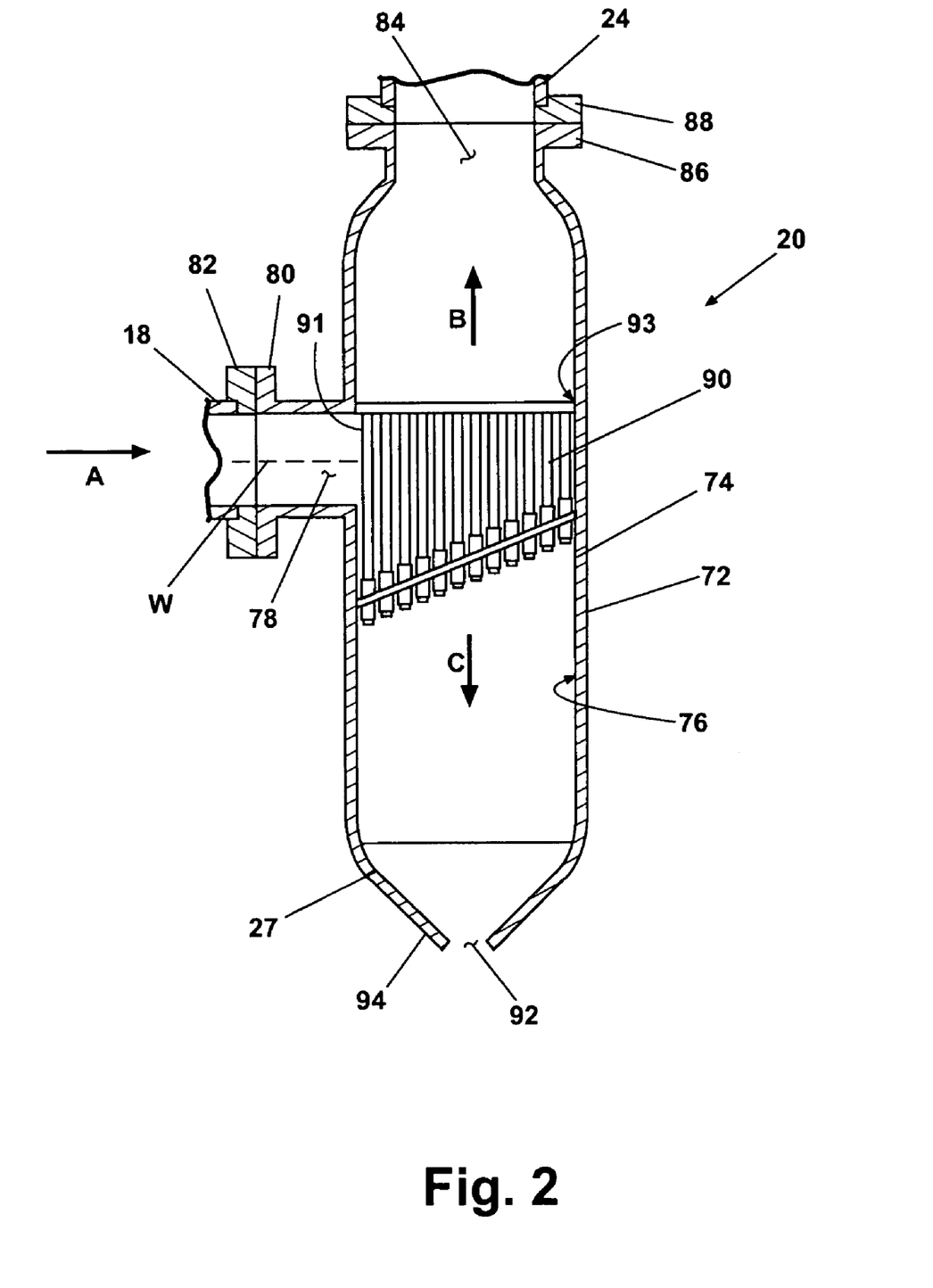
FIG. 2 is a cross-sectional view of a multi-clone separator according to a preferred embodiment of the present invention.

Referring generally to FIG. 2, an exemplary embodiment for hydrogen cyclone separator 20 includes a separator body 72 having a separator wall 74 and an inner wall layer 76. In this embodiment, separator body 72 is provided from a metal material, including metal suitable for operating at temperatures at or about 1200° F. Materials for separator body 72 can include steel, stainless steel, or one of the super alloy materials. Inner wall 76 can be the metal material or super alloy material noted above and can also be coated with a high temperature ceramic material. Hydrogen cyclone separator 20 receives calcium carbonate particles and discharged gases from hydrogen generator 12 (shown in FIG. 1), via generator discharge line 18 in the direction of flow arrow "A", and are received in an inlet 78. Exemplary system connections for inlet 78 include an inlet connector 80 shown in this embodiment as a flange connectible to a system connector 82 identified in this embodiment as a mating flange. It should be obvious to a practitioner in the art that inlet connector 80 and system connector 82 can be provided as a plurality of known connections including but not limited to welded connections, screwed connections, or coupling type connections. Hydrogen gas exits hydrogen cyclone separator 20 via a gas discharge end 84. Gas discharge end 84 includes a discharge connector 86 connected to a system connector 88 which provides connectivity to hydrogen discharge line 24. Hydrogen gas generally flows in the direction of flow arrow "B" to the gas discharge end 84.

Upon entering hydrogen cyclone separator 20, the fluid containing calcium carbonate particles 25 is flowing at a velocity ranging from approximately 3.05 m/sec (10 ft/sec) to approximately 15.24 m/sec (50 ft/sec). This flow can be directed along a direct, unobstructed flow path "W" into a cyclone tube assembly 90 which is shown and described in reference to FIG. 3. The gas flow can directly impinge a portion 91 of cyclone tube assembly 90 directly along flow path "W". From cyclone tube assembly 90, hydrogen can flow generally upward in the direction of flow arrow "B" and calcium carbonate particles 25 can drop in the general direction of flow arrow "C". Calcium carbonate particles 25 can collect adjacent to discharge end 27 and can be directed to a particle discharge throat 92 via a conical portion 94.

Because the temperature of the fluid entering hydrogen cyclone separator 20 is approximately 649° C. (1200° F.), inlet 78 can also be coated with a layer of ceramic material (not shown) similar to inner wall 76. A fluid tight seal 93 can be formed between cyclone tube assembly 90 and inner wall 76.

Figure 3:
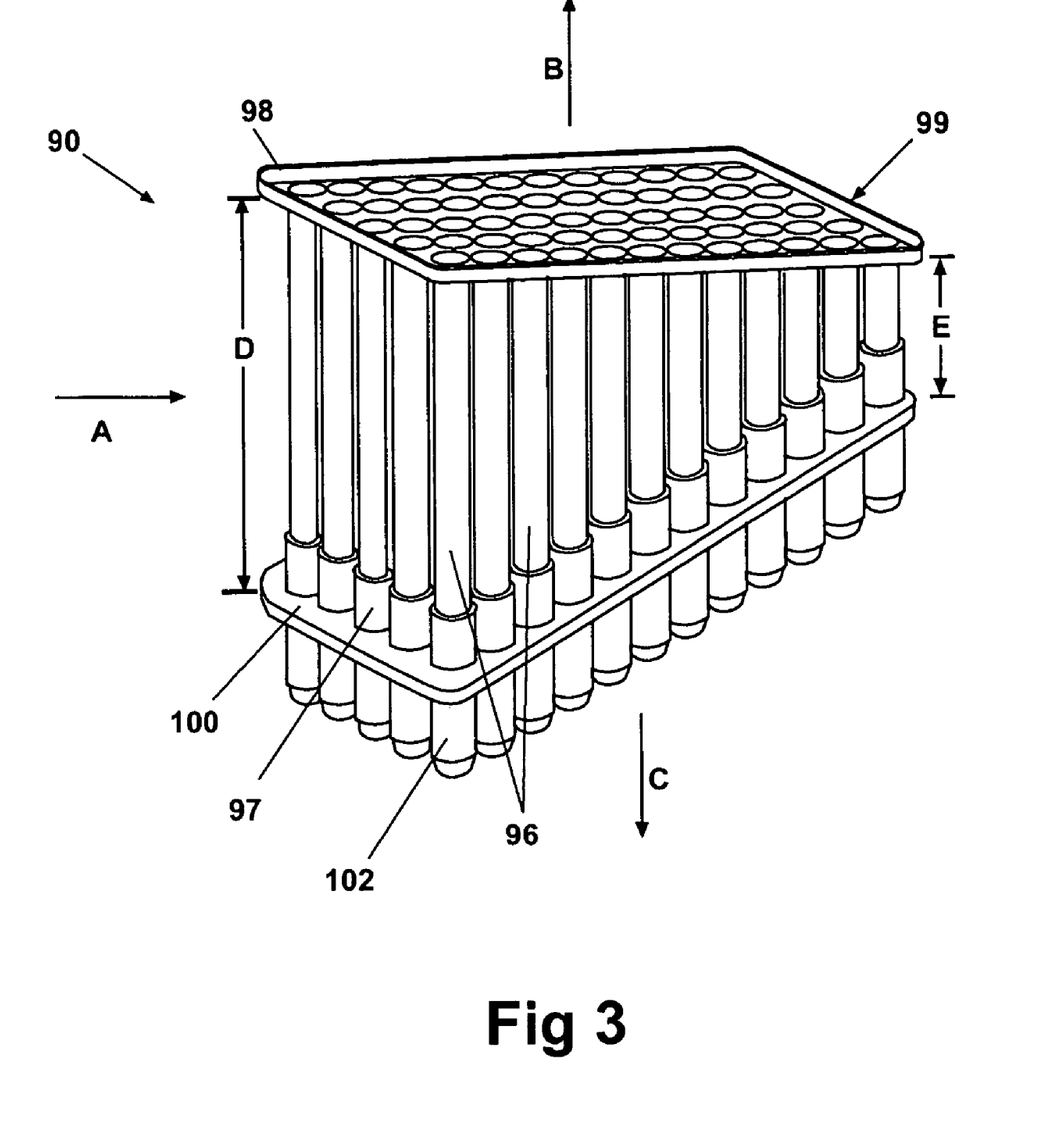
FIG. 3 is a perspective view of a cyclone-tube assembly according to a preferred embodiment of the present invention.

Referring generally to FIG. 3, cyclone tube assembly 90 can include a plurality of cyclone tubes 96 which can be connectably supported by a tube upper connection plate 98 and a tube lower connection plate 100, respectively. Fluid flow in the direction of flow arrow "A" enters cyclone tube assembly 90 from the left as viewed in FIG. 3. This fluid containing calcium carbonate particles 25 contacts each of the plurality of cyclone tubes 96. An inlet end 97 having an entrance height "D" of cyclone tube assembly 90 is greater than a height "E" of a distal end 99 to maintain a substantially equivalent pressure drop across each of the plurality of cyclone tubes 96 in cyclone tube assembly 90. Each of cyclone tubes 96 can be connected to either tube upper connection plate 98 or tube lower connection plate 100 by a fluid tight connection, for example by a welded joint. Other connection designs can also be used as known in the art providing that a fluid tight connection can be maintained at each of the intersections of a cyclone tube 96 and either tube upper connection plate 98 or tube lower connection plate 100, respectively.

As previously noted in reference to FIG. 2, hydrogen discharge flow exits cyclone tube assembly 90 in the direction of flow direction arrow "B" and calcium carbonate particles 25 are separated from the fluid portion and discharged from cyclone tube assembly 90 in the directional flow arrow "C". In the embodiment shown in FIG. 3, a length of each portion of cyclone tubes 96 either above tube upper connection plate 98 or below tube lower connection plate 100 can vary. Material for cyclone tubes 96 is preferably provided of a ceramic or a ceramic matrix composite material as previously discussed herein. Materials for tube upper connection plate 98 or tube lower connection plate 100 can be provided of a steel, a super alloy steel or a ceramic material. Each of the cyclone tubes 96 can be provided with a first tube section 102 which directly interface with tube lower connection plate 100. Material for first tube section 102 is preferably a steel or a super alloy material permitting a junction between each first tube section 102 and tube lower connection plate 100 to be formed as a welded joint.

Figure 4:
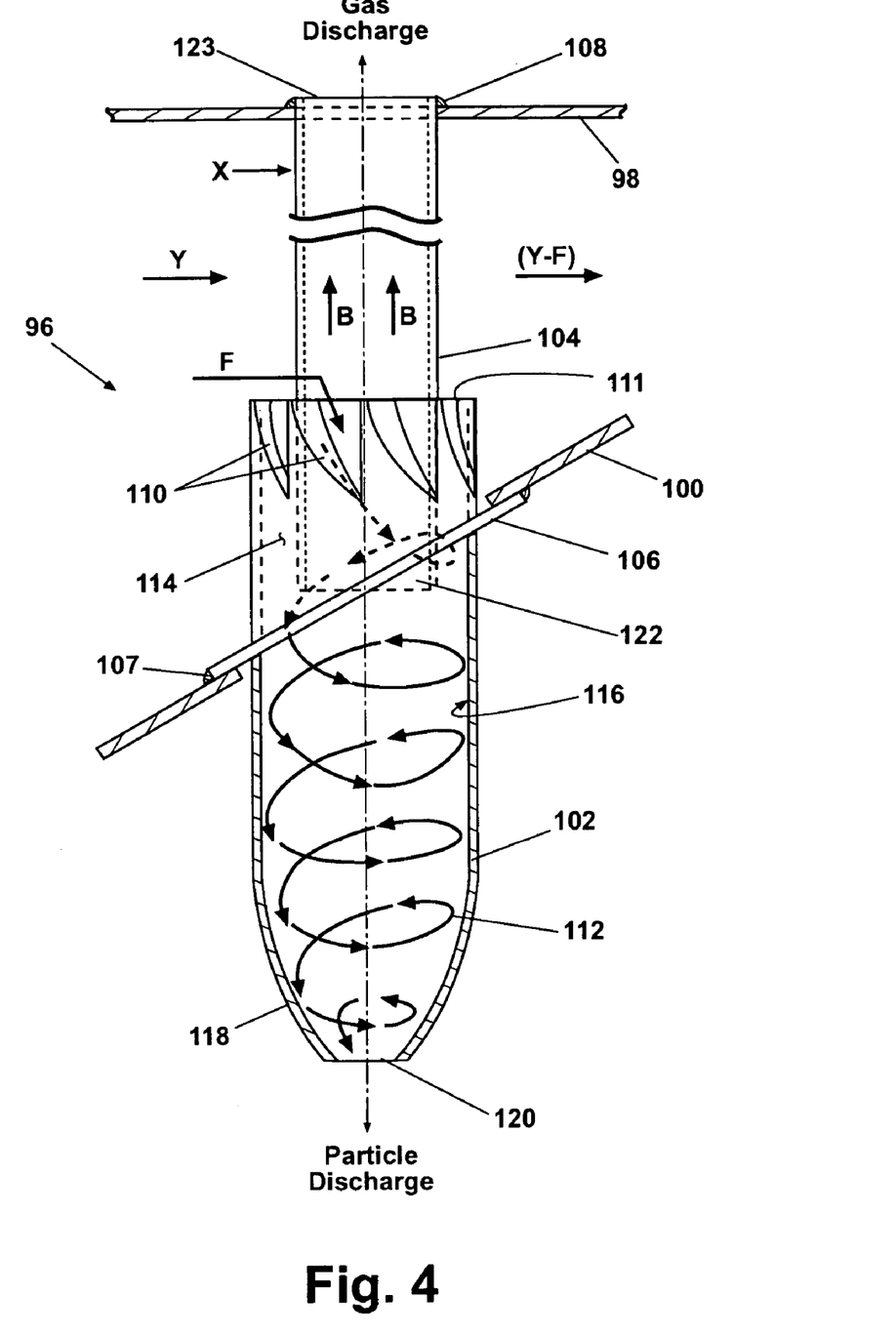
FIG. 4 is a partial cross-sectional view of an individual cyclone tube according to a preferred embodiment of the present invention.

As best seen in FIG. 4, each cyclone tube 96 includes first tube section 102 having a second tube section 104 connected thereto, for example by welding or brazing. Second tube section 104 can be a steel or super alloy material previously discussed herein having a ceramic or a CMC ceramic coating applied thereto or section tube section 104 can be entirely formed of a ceramic or CMC material. The ceramic or CMC ceramic material can provide resistance to the thermal shock each cyclone tube 96 is exposed to when fluid entering cyclone tube assembly 90 varies from a cold condition through and including the normal operating condition of approximately 635° C. (1200° F.). Each first tube section 102 can include a tube connection plate 106 externally connected to first tube section 102. Tube connection plate 106 can be joined to tube lower connection plate 100 of cyclone tube assembly 90 by a weld or braze joint 107. Each second tube section 104 can be connected to tube upper connection plate 98 using an attachment joint 108. Attachment joint 108 can be also a welded or brazed joint.

Flow in the direction of flow arrow "A" entering cyclone tube assembly 90 contacts an outer surface "X" of each second tube section 104. A portion "F" the overall flow entering cyclone tube assembly 90 can be directed by a plurality of flow directing members 110 into an upper open end 111 of first tube section 102. This fluid is directed into a cyclonic flow path 112 by the orientation of flow directing members 110. Flow directing members 110 direct the flow of fluid into an interstitial area 114 between a tube inner wall 116 of each of first tube section 102 and the outer surface "X" of second tube section 104. As fluid flow enters in the direction of flow portion "F" it is accelerated from the inward flow velocity (ranging from approximately 3.05 m/sec to approximately 15.24 m/sec) up to approximately 30.48 m/sec (100 ft/sec). This velocity increase is sufficient to separate the calcium carbonate particles 25 from the entrained gas flow. As the fluid flows in the cyclonic flow path 112, calcium carbonate particles 25 strike tube inner wall 116 slowing the heavier particles causing the calcium carbonate particles 25 to drop along tube inner wall 116 toward a discharge end 118 of first tube section 102. Calcium carbonate particles 25 subsequently can be discharged from first tube section 102 via a discharge opening 120. The remaining gas from the fluid flow entering first tube section 102, which can include hydrogen, unreacted methane, and/or steam, rises in the direction of flow arrows "B" and enters a second tube inlet 122 of second tube section 104. This gas volume continues to flow in the direction of flow arrows "B" within second tube section 104 and can be discharged from a tube discharge end 123 above tube upper connection plate 98.

Referring still to FIG. 4, the incoming flow of the fluid containing calcium carbonate particles 25 indicated as flow portion "Y" is reduced by the amount of the fluid which enters each cyclone tube 96 (indicated by flow portion "F") which results in a net reduction of overall fluid flow indicated as the flow relationship "Y" minus "F" (Y–F) viewed to the right of second tube section 104 in FIG. 4. To maintain a generally constant pressure drop across cyclone tube assembly 90, tube lower connection plate 100 is angled upwardly as viewed in FIG. 4 from left to right such that a continuously decreasing volumetric flow of fluid containing calcium carbonate particles 25 is directed to subsequent ones of the cyclone tubes 96. It is desirable that within each first tube section 102 cyclonic flow path 112 be provided with sufficient distance to achieve at least 5 rotational turns within first tube section 102 to maximize removal of calcium carbonate particles 25.

Figure 5:
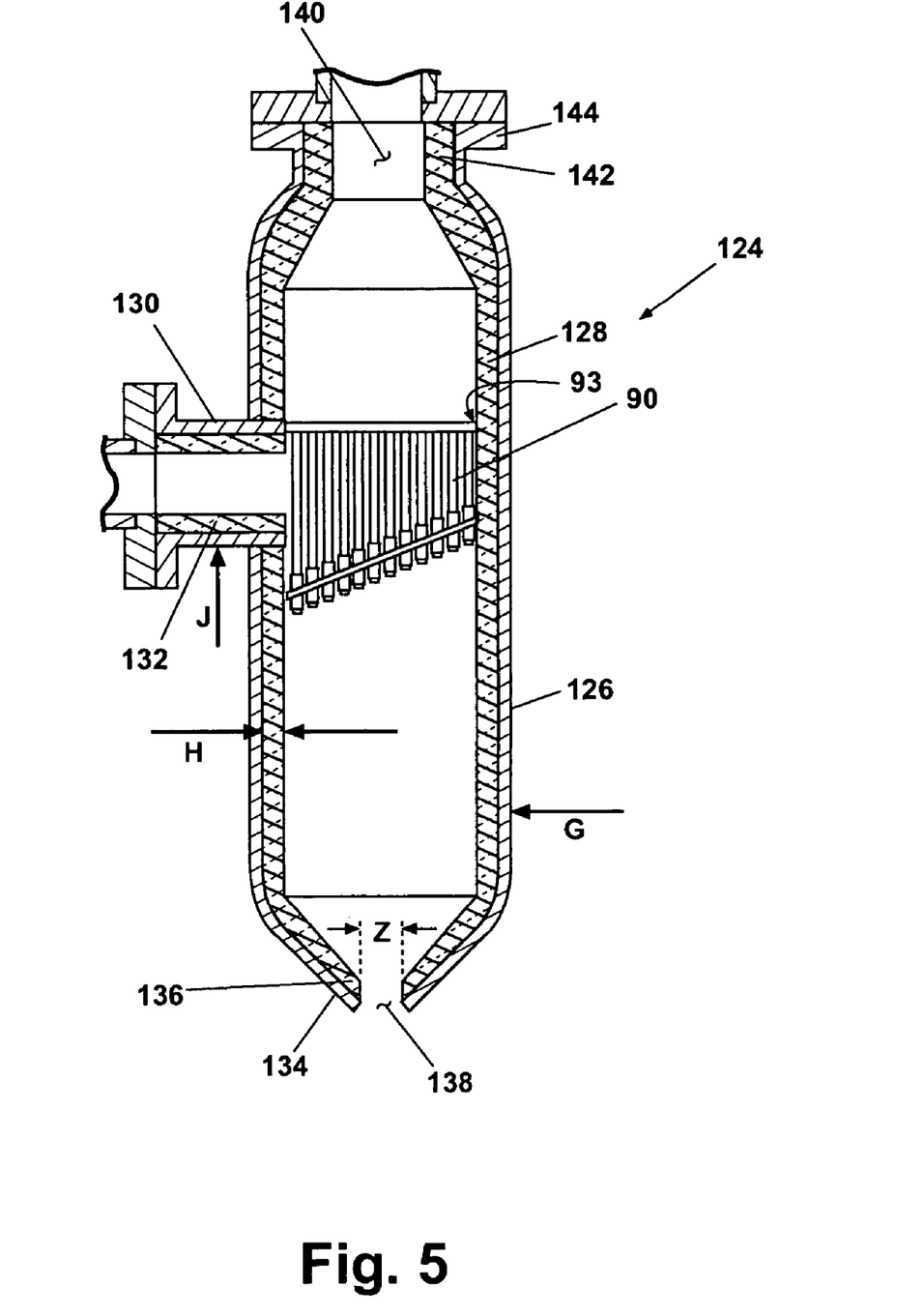
FIG. 5 is a cross-sectional view of another preferred embodiment of a cyclone separator of the present invention.

Referring generally to FIG. 5, a cyclone separator 124 according to another preferred embodiment of the present invention is adaptable to receive fluid flow from reformation system 10 where fluid temperatures reach approximately 983° C. (1800° F.). Because of the increased thermal load from fluid temperatures at approximately 983° C. (1800° F.) cyclone separator 124 can be provided with additional insulation materials. Cyclone separator 124 can include a separator wall 126 which is provided with an insulation layer 128 having an insulation thickness "H". An inlet connector 130 can be similarly provided with an inlet insulation layer 132. Materials for insulation layer 128 and inlet insulation layer 132 can be a ceramic material or a ceramic matrix composite material as previously discussed herein. This insulation material can be provided as a coating, as a plurality of individual blocks of insulation material, or by other processes generally known in the art. Cyclone separator 124 can further include a conical portion 134 similar to conical portion 94 of hydrogen cyclone separator 20. A reduced insulation area 136 can be provided adjacent to conical portion 134 to maintain a substantially constant flow area "Z" through a particle discharge throat 138. Reduced insulation area 136 can include insulation material similar to insulation layer 128 and inlet insulation layer 132.

Cyclone separator 124 differs from hydrogen cyclone separator 20 most significantly by the addition of the various insulation layers. Cyclone tube assembly 90 can be the same assembly as provided with hydrogen cyclone separator 20 or can be either increased or decreased in size relative to hydrogen cyclone separator 20. If cyclone tube assembly 90 is approximately the same size, an outer diameter "G" of cyclone separator 124 can be increased relative to hydrogen cyclone separator 20 to accommodate for insulation thickness "H". Similarly, a diameter "J" of inlet connector 130 can also be increased to accommodate a thickness of inlet insulation layer 132. A length of inlet connector layer 130 is also adjustable to accommodate insulation thickness "H". Gases discharged from cyclone separator 124 can exit via a gas discharge end 140 which can be partially formed through a reduced insulation area 142 adjacent to a discharge connector 144. Reduced insulation area 142 can be provided as similar insulation to insulation layer 128. Outer diameter "G" is provided if cyclone tube assembly 90 is formed as a generally circular assembly. Cyclone tube assembly 90 and cyclone separator 20 can be formed in a circular, an oval, a rectangular (similar to that shown in FIG. 3) or other geometric shape depending upon the design parameters and required total volumetric flow for either hydrogen cyclone separator 20 or cyclone separator 124.

To maintain the pressure drop across an individual cyclone separator below approximately 1 psid generally requires the gas velocity not to be accelerated within each cyclone assembly inlet above approximately 100 feet/second. Hence, the number of parallel operating cyclones, $N_c$, required for gas/solids separation is given by the following equation:

$$N_c = \frac{Q_t}{v_{g,in} A_{in}} \quad \text{Eq. 1}$$

where the variable $Q_T$ is the total volumetric flow rate of the particle laden gas stream, the variable $v_{g,in}$ is the cyclone separator's inlet gas velocity, and the variable $A_{in}$ is the cyclone separator's inlet cross-sectional flow area. For standard cyclone designs (as provided in Perry's, Chemical Engineers' Handbook, $5^{th}$ Ed., McGraw-Hill, 1973), the inlet cross-sectional flow area, $A_{in}$, is a function of the smallest particle diameter to be removed from the gas, $D_p$; the gas dynamic viscosity, $\mu$; the gas inlet velocity, $v_{g,in}$; and the particle/gas density difference, $\rho_p - \rho_g$, according to the following relation:

$$A_{in} \approx 0.1 \left[ \frac{v_{g,in}(\rho_p - \rho_g) D_p^2}{\mu} \right]^2 \quad \text{Eq. 2}$$

Hence, Equations 1 and 2 can provide the total number of cyclones, $N_c$, required for efficient separation within the assembly.

The cyclone tube assembly 90 includes a tapered cross-section, as shown in FIG. 3, so that the gas approach velocity to the most downstream cyclone tube 96 is maintained above the calcium carbonate particle 25 horizontal settling velocity. The tapered assembly is also designed so that the gas approach velocity is approximately the same to each cyclone tube, generally about 3.05 to 15.24 m/sec (10 to 50 ft/sec). Uniform flow distribution among all $N_c$ cyclone tubes will be maintained as the gas velocity is accelerated to approximately 30.48 m/sec (100 ft/sec) at each cyclone tube's inlet.

For reformation system 10, there are at least 2 high temperature 649° C. to 983° C. (1200° F. to 1800° F.) cyclones: hydrogen cyclone separator 20 operating within a reducing gas environment (downstream of hydrogen generator 12), and cyclone separator 44 operating within an oxidizing environment (downstream of the entrained flow calciner injector 34). In the case of the high temperature reducing gas cyclone, the individual cyclones are preferably manufactured from ceramic matrix composite (CMC) material which is not degraded by high temperature hydrogen rich gases. This can include a carbon fiber, silicon carbide matrix structure as described in U.S. Pat. No. 6,418,973 issued to Cox et al., commonly assigned to the assignee of the present invention, the disclosure of which is incorporated herein by reference.

For the high temperature oxidizing gas cyclone separator 44, a nickel based super alloy metal may be used. Other metals can be used such as aluminum metal containing alloys such as Fecralloy™ and Haynes 214™. The aluminum in these alloys has been shown to produce excellent protective alumina barrier coatings which help to prevent further substrate metal oxidation from the oxygen rich calciner gas. In addition to these iron or nickel based (aluminum containing) metals, CMCs made from alumina fibers with alumina matrix can also be used. In one embodiment, CMCs are made from SiC/SiC fiber/matrix structures. The SiC matrix on the CMC surface will oxidize to protective silica in an oxidizing environment and remain SiC in a reducing environment.

Cyclone separator 56, if required in reformation system 10, operates at similar temperatures as cyclone separator 44. Cyclone separator 56 is therefore preferably constructed from the same materials as cyclone separator 44.

A solids cyclone separator of the present invention offers several advantages. Because of the high operating temperatures (approximately 649° C. to approximately 983° C.) for the fluids of reformation system 10, high temperature materials having insulation (including ceramic and CMCs) can effectively perform the gas/solids separations at temperature and in compact devices without having to first cool and subsequently reheat the solid particle flow streams. CMC construction can allow these separators to maintain high structural strength at high temperatures while also providing adequate thermal shock protection. Particle sizes down to approximately 10 microns can be separated from the fluid flow using individual cyclone tubes according to the present invention. Calcium carbonate particle sizes ranging from approximately 30 to approximately 50 microns can therefore be separated by the cyclone tubes of the present invention. A total volumetric flow of the gas and calcium carbonate particles of approximately 60 million standard cubic feet/day can be separated using a multi-clone separator of the present invention. By configuring the plurality of the cyclone tubes into a tapering assembly a flow velocity ranging from approximately 3.05 to 15.24 m/sec (10 to 50 ft/sec) can be maintained throughout a cyclone tube assembly of the present invention while permitting the total pressure drop across the cyclone tube assembly to be maintained at or below approximately 0.0138 MPad (2 psid) differential.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A cyclone separator, comprising:
   a body having a side entry fluid inlet, a first outlet and a second outlet both aligned substantially transverse to the fluid inlet, and the first and second outlets opposing each other;
   a cyclone tube assembly positionable within the body and having at least a portion of the cyclone tube assembly positioned in a direct unobstructed alignment path with the fluid inlet, the cyclone tube assembly including:
      a plurality of cyclone tubes, each including a first tube section and a second tube section partially positionable within the first tube section;
      a ceramic material operably forming at least a portion of the second tube section of each cyclone tube;
      a first tube connection plate positioned above the fluid inlet defining a horizontal substantially unobstructed flow path of fluid passing from the fluid inlet and through the cyclone tubes, the first tube connection plate connectably supporting the first tube section of each of the cyclone tubes; and
      a second tube connection plate connectably supporting the second tube section of each of the cyclone tubes, the second connection plate below the first tube connection plate and angularly offset from the first tube connection plate.

2. The cyclone separator of claim 1, wherein the body comprises at least one of a steel material, a super alloy material and a ceramic matrix composite material.

3. The cyclone separator of claim 1, wherein a second tube section outside diameter is smaller than a first tube section outside diameter operably providing an interstitial space between the second tube section and the first tube section.

4. The cyclone separator of claim 3, comprising a plurality of arc-shaped flow directing members positioned at an inlet end of the first tube section, wherein a fluid contacting the flow directing members is operably directed in a cyclonic flow path within the interstitial space.

5. The cyclone separator of claim 1, wherein the ceramic material operably forming at least the portion of the second tube section comprises a ceramic matrix composite material.

6. The cyclone separator of claim 1, wherein the ceramic material operably forming at least the portion of the second tube section comprises a ceramic coating substantially covering the second tube section.

7. The cyclone separator of claim 1, comprising:
   an inlet of the cyclone tube assembly having a first height; and
   a distal end of the cyclone tube assembly having a second height;
   wherein the first height is greater than the second height such that a fluid flow pressure drop from the inlet to the distal end is substantially constant.

8. The cyclone separator of claim 7, wherein the plurality of cyclone tubes define a tapering assembly operable with a flow velocity ranging from approximately 3.05 to 15.24 m/sec (10 to 50 ft/sec) throughout the cyclone tube assembly to limit the pressure drop from the inlet to the distal end to a maximum 2 psid differential.

9. The cyclone separator of claim 1, comprising one of a weld and a braze joint operably connecting each second tube section to the second tube connection plate.

10. The cyclone separator of claim 1, comprising:
    a tube adapter plate connectable to the first tube section; and
    a sealing joint operably joining the tube adapter plate of each first tube section to the first tube connection plate.

11. A cyclone separator system, comprising:
    a cyclone separator body having a body wall and opposed first and second ends;
    a first insulation layer positioned within the separator body in contact with the outer wall;
    a cyclone tube assembly having a plurality of cyclone tubes, the cyclone tube assembly positioned in contact with the first insulation layer, the cyclone tubes including a ceramic matrix composite material operably forming at least a portion of the tubes;
    a substantially gas-tight seal operably formed between the cyclone tube assembly and the first insulation layer;
    a mixture inlet connected to the body wall substantially transverse to the opposed first and second ends, the mixture inlet having an interior insulation layer;
    first and second tube connection plates, the first plate positioned above the mixture inlet and oriented substantially parallel to an orientation of the mixture inlet, the second plate positioned below the first plate and oriented at an angle with respect to the first plate having the second plate directed angularly upward away from the mixture inlet; and
    a plurality of arc-shaped flow directing members disposed on each of the cyclone tubes;
    wherein a mixture contacting the flow directing members is operably directed in a cyclonic flow path within each of the cyclone tubes.

12. The system of claim 11, comprising:
    a conically shaped particle discharge end of the cyclone separator body operably formed at the first end; and
    a second insulation layer disposed adjacent the particle discharge end;
    wherein a particle discharge aperture is operably formed through both the particle discharge end and the second insulation layer.

13. The system of claim 11, comprising:
    a substantially tubular shaped fluid outlet operably formed at the second end; and
    a third insulation layer disposed adjacent the fluid outlet;
    wherein a fluid discharge aperture is operably formed through both the fluid outlet and the third insulation layer.

14. The system of claim 11, wherein each of the plurality of cyclone tubes of the cyclone tube assembly comprises a first tube section and a second tube section at least partially positionable within the first tube section.

15. The system of claim 14, comprising:
    the first tube connection plate connectably supporting the first tube section of each of the cyclone tubes; and
    the second tube connection plate connectably supporting the second tube section of each of the cyclone tubes.

16. The system of claim 14, wherein the flow directing members are positioned at an inlet end of each first tube section.

17. A method for separating a plurality of particles from a fluid using a cyclone separator, the cyclone separator including a separator body, a fluid inlet, a gas outlet, a particle outlet, and a cyclone separator tube assembly having a plurality of cyclone tubes, the method comprising:

orienting a horizontally positioned cyclone tube connection plate above the fluid inlet to operably permit a substantially horizontal and unobstructed flow path for the fluid from the fluid inlet to a rear portion of the cyclone separator tube assembly;

continuously reducing a height of the cyclone tube assembly from an inlet to a distal end of the cyclone tube assembly;

aligning at least a portion of the inlet of the cyclone separator tube assembly with the fluid inlet;

directing a heated fluid containing at least a plurality of particles via the fluid inlet into the cyclone separator tube assembly;

accelerating the heated fluid at a tube inlet of each of the cyclone tubes;

separating the heated fluid within the cyclone tubes into the plurality of particles and a gas; and discharging the plurality of particles from the particle outlet.

18. The method of claim 17, comprising coating each of the cyclone tubes with a ceramic material.

19. The method of claim 17, comprising creating each of the cyclone tubes of a ceramic material.

20. The method of claim 17, comprising discharging the gas from the gas outlet.

21. The method of claim 17, comprising operably limiting a pressure drop of the heated fluid across the tube assembly to a maximum of approximately 0.0138 MPa differential.

22. The method of claim 17, comprising:
applying an insulation to an inner wall of the separator body; and
creating a fluid tight connection between the cyclone separator tube assembly and the insulation.

23. The method of claim 17, comprising accelerating the portion of the heated fluid at the tube inlet to approximately 30 m/sec.

24. The method of claim 17, comprising:
creating a cyclonic flow of the heated fluid using a flow directing member positionable at the tube inlet; and
separating the heated fluid using at least five revolutions of the cyclonic flow within each of the cyclone tubes.

25. The method of claim 17, comprising creating a fluid tight connection between the cyclone separator tube assembly and the separator body.

* * * * *